United States Patent
Yamaguchi et al.

(10) Patent No.: US 9,075,620 B2
(45) Date of Patent: Jul. 7, 2015

(54) INSTRUCTION EXECUTION CIRCUIT

(75) Inventors: Junji Yamaguchi, Ora-gun (JP); Koichi Abe, Ora-Gun (JP)

(73) Assignee: SEMICONDUCTOR COMPONENTS INDUSTRIES, LLC, Pheonix, AZ (US)

( * ) Notice: Subject to any disclaimer, the term of this patent is extended or adjusted under 35 U.S.C. 154(b) by 206 days.

(21) Appl. No.: 13/335,132

(22) Filed: Dec. 22, 2011

(65) Prior Publication Data

US 2012/0166205 A1    Jun. 28, 2012

(30) Foreign Application Priority Data

Dec. 22, 2010 (JP) ................. 2010-286042

(51) Int. Cl.
*G10L 19/00* (2013.01)
*G06F 9/38* (2006.01)

(52) U.S. Cl.
CPC ...................................... *G06F 9/381* (2013.01)

(58) Field of Classification Search
USPC ................................................. 704/500–504
See application file for complete search history.

(56) References Cited

U.S. PATENT DOCUMENTS

| | | | | |
|---|---|---|---|---|
| 5,930,518 | A * | 7/1999 | Suzuki ............................ | 712/1 |
| 6,757,817 | B1 | 6/2004 | Booth | |
| 2001/0036321 | A1 * | 11/2001 | Kishi ............................ | 382/240 |
| 2002/0063777 | A1 * | 5/2002 | Maekawa et al. ............. | 348/143 |
| 2003/0120899 | A1 | 6/2003 | Stotzer et al. | |
| 2005/0114560 | A1 * | 5/2005 | Coleman et al. ............... | 710/22 |
| 2005/0251669 | A1 | 11/2005 | Booth | |
| 2007/0113057 | A1 | 5/2007 | Knoth | |

FOREIGN PATENT DOCUMENTS

JP    2009-230773 A    10/2009

OTHER PUBLICATIONS

Extended Search Report for European Application No. 11194947.5 dated Apr. 3, 2012 (5 pages).

* cited by examiner

*Primary Examiner* — Leonard Saint Cyr

(57) ABSTRACT

An instruction execution circuit includes: a memory circuit including a first memory element and a second memory element configured to require less power than the first memory element; a processor; and an address decoder configured to output an enable signal to either one, storing an instruction, of the first memory element and the second memory element when an address is outputted from the processor, the enable signal corresponding to a signal to output the instruction stored at the address, one portion of a program stored in the first memory element corresponding to a portion in which processing other than loop processing is described, the loop processing causing the processor to execute the specific instruction in a repetitive manner, the other portion of a program stored in the second memory element corresponding to a portion in which the loop processing is described.

9 Claims, 6 Drawing Sheets

INSTRUCTION EXECUTION CIRCUIT

CROSS-REFERENCE TO RELATED APPLICATION

This application claims the benefit of priority to Japanese Patent Application No. 2010-286042, filed Dec. 22, 2010, of which full contents are incorporated herein by reference.

BACKGROUND OF THE INVENTION

1. Field of the Invention

The present invention relates to an instruction execution circuit.

2. Description of the Related Art

Today, electronic devices which incorporate an instruction execution circuit in which a processor reads and executes an instruction of a program stored in a memory circuit such as memory are used in various fields.

In the audio field, for example, electronic devices which perform processing such as compression, data processing, reproduction and the like of sound, which was made into digital data, by execution of the program by the processor, are widely spread.

If sound is handled as digital data, in order to reduce the data amount, digital data is encoded in accordance with a predetermined standard and decoded in reproduction in general. MP3, WMA, AAC and the like are known as the standards of encoding and decoding.

In this case, the processor performs encoding and decoding processing by sequentially reading out instructions of a program for encoding and decoding from a memory circuit and executing the same. Various such technologies for encoding and decoding have been developed (See Japanese patent Laid-Open No. 2009-230773, for example).

By referring to an instruction execution circuit 1010 illustrated in FIGS. 4 to 6, a flow of decoding processing by a processor 100 will be described.

Memory 200 stores a plurality of instructions included in a program for performing decoding. Also, the processor 100 performs decoding processing by executing each instruction stored in the memory 200. The processor 100 and the memory 200 are operated in synchronization with a clock signal outputted from a clock generation circuit 500.

In general, the processing of decoding encoded data generated by encoding digital sound data is performed by the unit of data called frame. After the processor 100 decodes the encoded data for one frame, the processor 100 does not start decoding of the encoded data of the subsequent frame in a row but waits for completion of reproduction of the previously decoded digital data and then, starts decoding of the encoded data of the subsequent frame. Therefore, the processor 100 repeatedly executes the decoding program illustrated in FIG. 6 by the frame.

The processor 100 outputs a value of an address where the instruction is stored to an address bus in the order of execution of the instructions included in this program. The value of the address is calculated by a program counter, not shown, provided in the processor 100. The address outputted from the processor 100 is inputted into the memory 200 and an address decoder 410.

When the address is inputted, the address decoder 410 outputs an enable signal (CE. An inverse sign is omitted. The same applies to the following.) to the memory 200.

The memory 200 outputs the instruction stored at the inputted address to the data bus while the enable signal is inputted.

Then, the processor 100 obtains the instruction outputted to the data bus and executes the instruction.

When the processor 100 sequentially executes the above processing for each instruction included in the program, the encoded data for one frame is decoded.

As illustrated in FIG. 6, the program for performing decoding starts with an "LD R1" instruction indicated by a label reading "START:" and ends with a "JUMP WAIT" instruction. However, a jump destination of the "JUMP WAIT" is a "NOP" instruction indicated by a label reading "WAIT:".

Thus, after decoding of the encoded data for one frame is finished, the processor 100 waits for completion of reproduction of the digital data of the frame by repeatedly reading out and executing the "NOP" instruction and the "JUMP WAIT" instruction.

When the reproduction of the digital data of the frame is completed, as illustrated in FIG. 5, an interrupt signal is inputted into the processor 100. Then, the processor 100 starts sequential execution of each instruction from the "LD R1" instruction indicated by the label reading "START:" again so as to start decoding of the encoded data of the subsequent frame.

A data amount of the encoded data in one frame varies with a bit rate or sampling frequency designated when the digital sound data is encoded, and time required for decoding the encoded data in one frame varies with the bit rate or sampling frequency. Thus, latency time until the reproduction of the previously decoded digital data is completed varies with the bit rate or sampling frequency.

When a case with a large data amount in one frame is compared with a case with a small data amount, as illustrated in FIG. 4, if the data amount in one frame is large (case A), decoding requires long time for that portion, and the latency time becomes short, while if the data amount in one frame is small (case B), decoding requires only short time, and the latency time becomes long.

As described above, until the reproduction of the decoded digital data is completed, the processor 100 repeatedly reads and executes the "NOP" instruction and the "JUMP WAIT" instruction. Therefore, the instruction execution circuit 1010 illustrated in FIG. 5 consumes power even during the latency time.

The electronic devices which can handle sound as such digital data have spread in the forms of portable phones, portable music players, IC recorders, on-board music players and the like. Many of these electronic devices are operated by power from a battery, and suppression of power consumption is in strong demand.

Also, the demand for power saving is strong not only for the audio electronic devices but also for the electronic devices incorporating an instruction execution circuit provided with a processor and a memory circuit.

The present invention was made in view of the above problems and has an object to reduce power consumption of an instruction execution circuit provided with a memory circuit storing a program and a processor executing the program.

SUMMARY OF THE INVENTION

An instruction execution circuit according to an aspect of the present invention, includes: a memory circuit including a first memory element configured to store a portion of a program including a plurality of instructions and a second memory element configured to store an other portion of the program and require less power than the first memory element; a processor configured to output an address of an instruction in the plurality of instruction to the memory circuit, obtain the instruction stored at the address from the memory circuit, and execute the instruction, in the order of execution of the plurality of instructions included in the program; and an address decoder configured to output an enable signal to either one, storing the instruction, of the first memory element and the second memory element when the address is outputted from the processor, the enable signal corresponding to a signal to output the instruction stored at the address, the other portion of the program stored in the second memory element corresponding to a portion in which loop processing is described, the loop processing causing the processor to execute the specific instruction in a repetitive manner, the one portion of the program stored in the first memory element corresponding to a portion in which processing other than the loop processing is described.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

A configuration example of an instruction execution circuit 1000 according to an embodiment of the present invention will be described referring to FIGS. 1 to 4.

Figure 1:
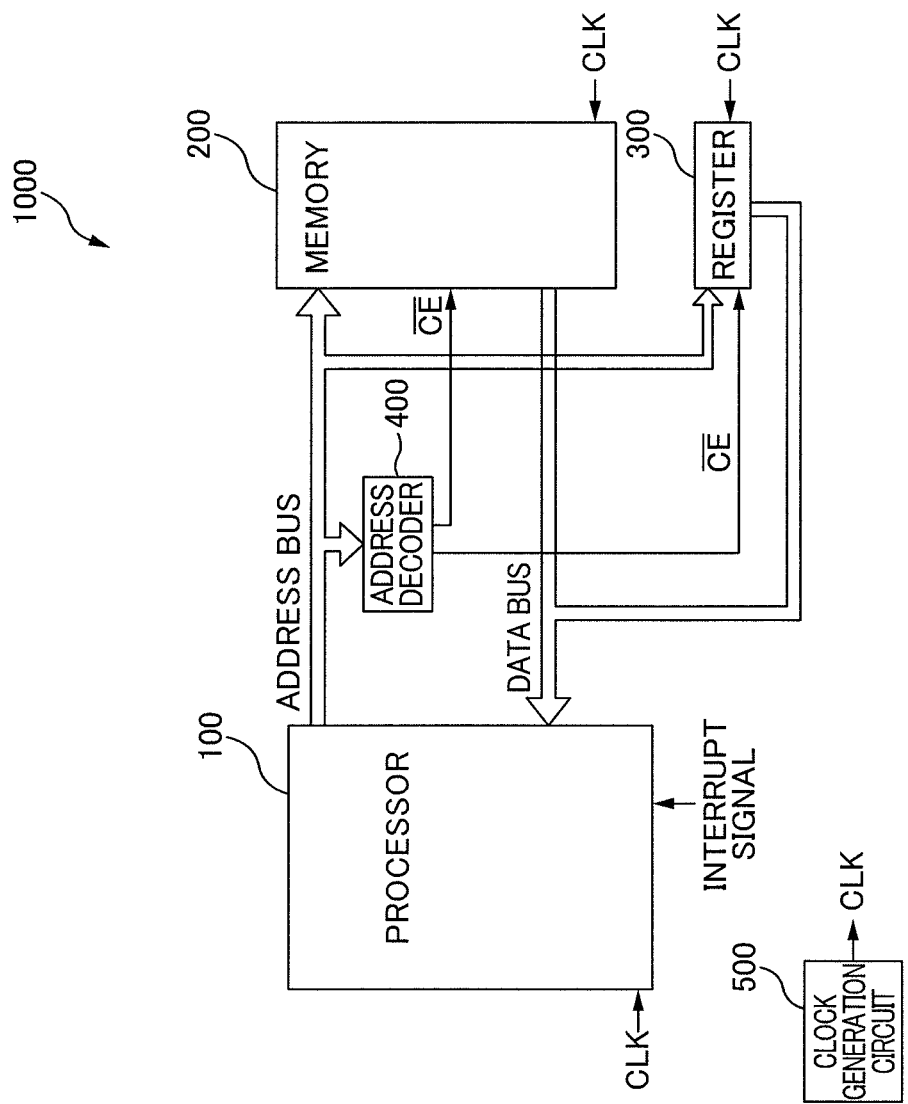
FIG. 1 is a diagram illustrating a configuration example of an instruction execution circuit according to this embodiment.

As illustrated in FIG. 1, the instruction execution circuit 1000 includes a processor 100, a memory (first memory element) 200, a register (second memory element) 300, and an address decoder 400. The memory 200 and the register 300 are also collectively referred to as a memory circuit.

A clock generation circuit 500 may be or may not be a constituent element of the instruction execution circuit 1000, and the processor 100, the memory 200, and the register 300 operate in synchronization with a clock generated by the clock generation circuit 500.

The processor 100 reads an instruction included in a program stored in the memory circuit (the memory 200 and the register 300) from the memory circuit and executes the instruction in the order of execution of instructions.

The processor 100 includes a program counter, not shown, and outputs a value of this program counter to an address bus as an address where the instruction is stored. Then, the processor 100 obtains and executes the instruction outputted from the memory circuit to the data bus. The value of the program counter is updated so as to indicate the address of the instruction to be subsequently executed by the processor 100 each time the processor 100 executes one instruction. As a result, the processor 100 can sequentially obtain instructions from the memory circuit in the order of execution of the instructions and execute the same.

The memory 200 and the register 300 store instructions of the program executed by the processor 100. The memory 200 stores a portion of the program, while the register 300 stores the other portion of the program.

Also, the memory 200 includes a RAM, a ROM, a flash memory and the like. The register 300 includes a plurality of flip-flops, for example.

Figure 2:
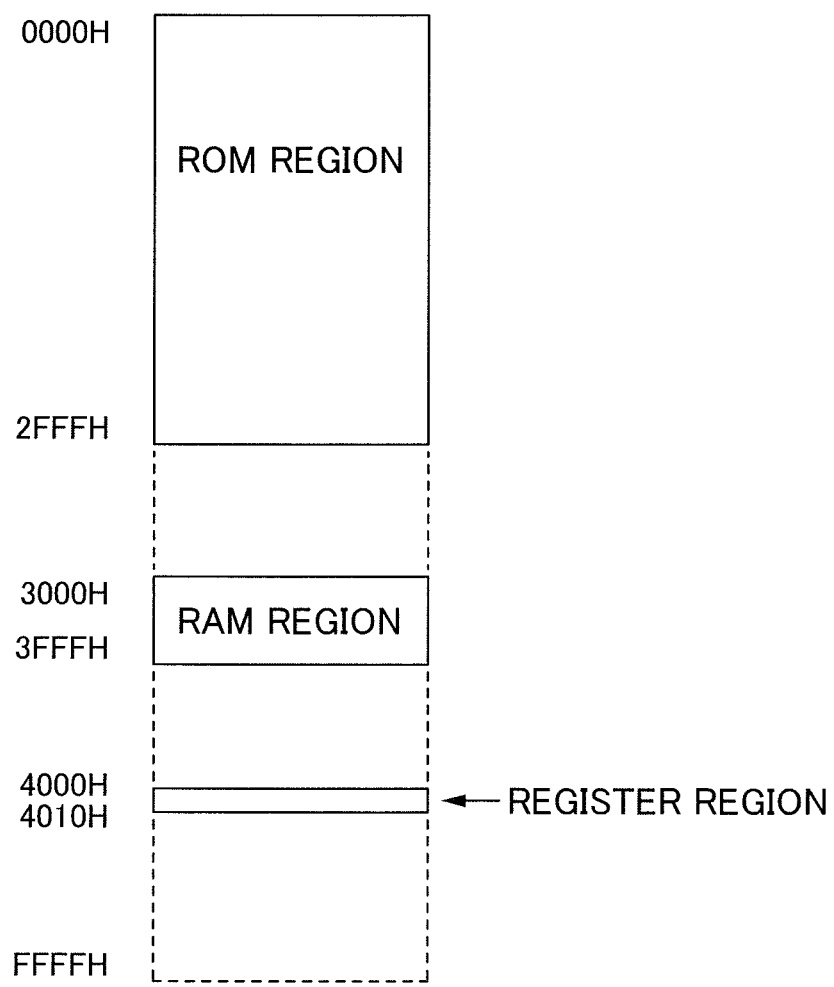
FIG. 2 is a diagram illustrating an example of a memory map according to this embodiment.

Addresses are allocated to the memory 200 and the register 300 as illustrated in a memory map illustrated in FIG. 2 as an example. That is to say, to a region including the ROM in the memory 200, addresses of 0000H to 2FFFH are allocated, to a region including the RAM in the memory 200, the addresses of 3000H to 3FFFH are allocated, and to a region including the register 300, the addresses from 4000H to 4010H are allocated.

The address decoder 400 outputs an enable signal (CE) to either one of the memory 200 and the register 300 specified in accordance with the memory map illustrated in FIG. 2 corresponding to the address outputted from the processor 100 to the address bus. The enable signal corresponds to a signal to output a stored instruction to the memory 200 and the register 300.

That is to say, the memory 200 and the register 300 output an instruction stored at the address outputted to the address bus to the data bus while the enable signal is inputted thereto.

Electric power is supplied from a power supply circuit, not shown, to the memory 200 and the register 300, which consume predetermined power. The memory 200 and the register 300 require larger power while the enable signal is inputted than that during a period during which the enable signal is not inputted.

Also, if the power consumption of the memory 200 is compared with that of the register 300, since the memory 200 has a larger circuit size than the register 300, the memory 200 requires larger power.

Figure 3:
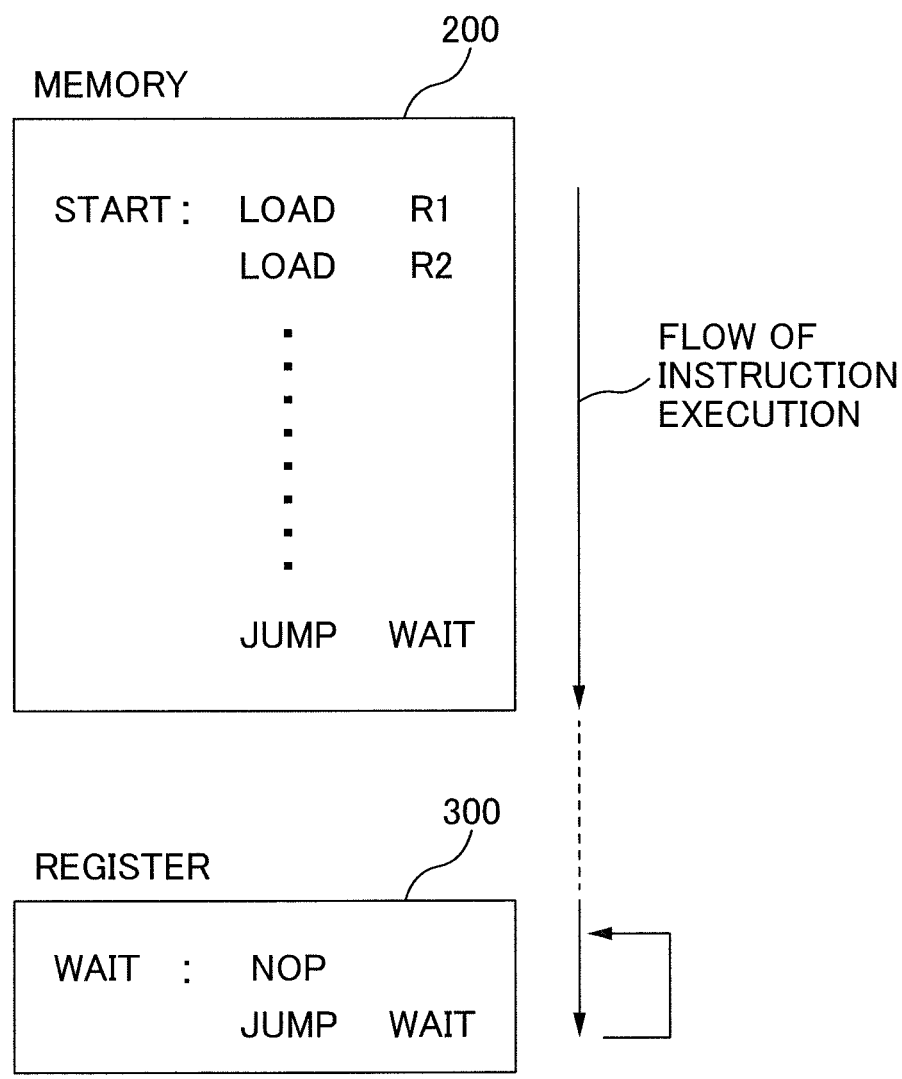
FIG. 3 is a diagram illustrating an example of a program according to this embodiment.

The memory 200 and the register 300 store a program as illustrated in FIG. 3. The processor 100 reads and executes instructions included in the program in the order from the first instruction in the program. The first instruction is an "LD R1" instruction labeled with "START:" as an example in FIG. 3. When the processor 100 reads and executes a "JUMP WAIT" instruction stored in the memory 200, then, the processor 100 reads and executes an "NOP" instruction stored in the register 300 and labeled with "WAIT:" at the subsequent instruction reading-out timing. At the further subsequent reading timing of the instruction, the processor 100 reads and executes the "JUMP WAIT" instruction stored in the register 300.

Then, the processor 100 reads and executes the "NOP" instruction stored in the register 300 and labeled with "WAIT:" again at the further subsequent instruction reading timing. The processor 100 repeatedly executes the "NOP" instruction and the "JUMP WAIT" instruction stored in the register 300.

While the processor 100 executes the "NOP" instruction and the "JUMP WAIT" instruction stored in the register 300 in a repetitive manner, the address decoder 400 outputs the enable signal only to the register 300 and does not output the enable signal to the memory 200.

Since the enable signal is not inputted to the memory 200 during this time period, the power consumption of the memory 200 is reduced. On the contrary, since the enable signal is continuously inputted to the register 300, the power consumption of the register 300 is increased.

Since the memory 200 is a circuit which stores a large amount of data of approximately several kilobytes to several gigabytes, for example, its circuit size is much larger than the register 300 which stores only several bytes to several tens bytes, and the power consumption during data reading is overwhelmingly larger than the register 300.

Therefore, while the processor 100 executes the "NOP" instruction and the "JUMP WAIT" instruction stored in the register 300 in an repetitive manner, the enable signal is not outputted to the memory 200 and the instructions are not read out of the memory 200, and power consumption of the instruction execution circuit 1000 as a whole can be reduced.

With the instruction execution circuit 1000 according to an embodiment of the present invention, the power consumption can be reduced without stopping generation of a clock, for example. The fact that the clock does not have to be stopped means that various data saving processing required when the clock is to be stopped or complicated processing such as data recovery processing required when the clock is to be resumed is not necessary, and a special circuit or a program for stopping/resuming the clock is not needed, either.

Moreover, time required for processing to stop the clock or time required for processing to resume the clock is not needed either, and thus, the power consumption can be reduced without degrading the performances of information processing by the processor 100.

As described above, the power consumption of the instruction execution circuit 1000 can be reduced, by storing in the register 300 a portion having described therein an algorithm of loop processing causing the processor 100 to execute specific instructions in a repetitive manner, and by storing other portion in the memory 200, among a plurality of instructions included in the program.

The specific instructions describing the algorithm of the loop processing stored in the register 300 may be those which finish the loop processing when having been repeatedly executed a predetermined number of times (finite loop) or may be those repeatedly executed without limitation on the number of times (infinite loop).

Also, the register 300 may store an instruction which executes not only one loop processing but a plurality of loop processing.

The program illustrated in FIG. 3 includes a first portion including the first instruction and a second portion executed after the first portion is finished, and the first portion is stored in the memory 200 and the second portion is stored in the register 300. The processor 100 executes instructions of the first portion stored in the memory 200 in the order from the first instruction and then, executes the instructions of the loop processing of the second portion stored in the register 300.

However, the configuration of the program is not limited to that.

For example, if the program includes the first portion including the first instruction, the second portion executed after the execution of the first portion is finished, and a third portion executed after the execution of the second portion is finished, it may be so configured that the first portion and the third portion are stored in the memory 200 and the second portion is stored in the register 300.

In this case, when the processor 100 executes the instructions of the second portion, it may be so configured that, if a predetermined interrupt signal is inputted to the processor 100, the processor 100 ends the instruction of the second portion and starts execution of the instructions of the third portion. Alternatively, the instruction may be described in the second portion in advance such that the execution of the third portion is started when the processor 100 performs execution a predetermined number of times in a repetitive manner.

Alternatively, if the program includes the first portion including the first instruction and the second portion executed after the execution of the first portion is finished, it may be so configured that the first portion is stored in the register 300 and the second portion in the memory 200.

The instruction execution circuit 1000 according to an embodiment of the present invention can be applied to any applications as long as information is processed by executing a program including loop processing. As an example, an instruction execution circuit 1000 which decodes encoded data obtained by encoding digital sound data will be described.

Today, as the standards of encoding and decoding, MP3, WMA, AAC and the like are known.

In this case, the program stored in the memory circuit (the memory 200 and the register 300) illustrated in FIG. 3 is the program to decode the encoded data. The processor 100 executes decoding processing by sequentially reading the instruction of the program for decoding from the memory circuit and executing the same.

The memory circuit stores instructions included in the program for decoding. The processor 100 performs decoding by executing the program stored in the memory circuit. The processor 100 and the memory circuit operate in synchronization with a clock signal outputted from the clock generation circuit 500.

In general, the processing of decoding the encoded data generated by encoding digital sound data is performed by a unit of data called frame. The processor 100 decodes the encoded data for one frame, and then, does not start decoding of the encoded data of the subsequent frame in series but waits for completion of reproduction of the previously decoded digital data, and then starts decoding of the encoded data of the subsequent frame. Therefore, the processor 100 repeatedly executes the decoding program illustrated in FIG. 3 for each frame.

The processor 100 outputs the value of the address where the instruction is stored to the address bus in the order of execution of the instructions included in this program. The value of the address is calculated by a program counter, not shown, provided in the processor 100. The address outputted from the processor 100 is inputted to the memory 200 and the address decoder 400.

The address decoder 400 outputs an enable signal (CE) to the memory 200 or the register 300 when the address is inputted.

The memory 200 or the register 300 outputs an instruction stored in the address inputted, while the enable signal is inputted, to the data bus.

Then, the processor 100 obtains the instruction outputted to the data bus and executes the instruction.

The processor 100 sequentially executes above processing for each instruction included in the program so that decoding of the encoded data for one frame is executed.

As illustrated in FIG. 3, the register 300 stores the instruction describing the algorithm of the loop processing including the "NOP" instruction labeled with "WAIT:" and the "JUMP WAIT" instruction. The memory 200 stores the instruction to decode the encoded data in the frame.

The processor 100 executes decoding processing of the encoded data by executing the instructions in the memory 200 in the order from the first instruction, and when it executes the "JUMP WAIT" instruction in the memory 200, it reads and executes the "NOP" instruction labeled with "WAIT:" in the register 300 at the subsequent instruction reading timing.

Thereafter, the processor 100 executes the "NOP" instruction and the "JUMP WAIT" instruction in the register 300 in a repetitive manner. As described above, the processor 100 makes a time adjustment until reproduction of the digital data after completion of decoding is finished.

When the reproduction of the digital data in that frame is completed, as illustrated in FIG. 1, an interrupt signal is inputted to the processor 100. Then, the processor 100 starts execution from the first instruction of the program again in order to start decoding of the encoded data of the subsequent frame.

As described above, the data amount of the encoded data in one frame varies with the bit rate or sampling frequency designated when the digital sound data is encoded, and thus, time required for decoding the encoded data in one frame varies with the bit rate or sampling frequency. Therefore, latency time until the reproduction of the previously decoded digital data is completed varies with the bit rate or sampling frequency.

Figure 4:
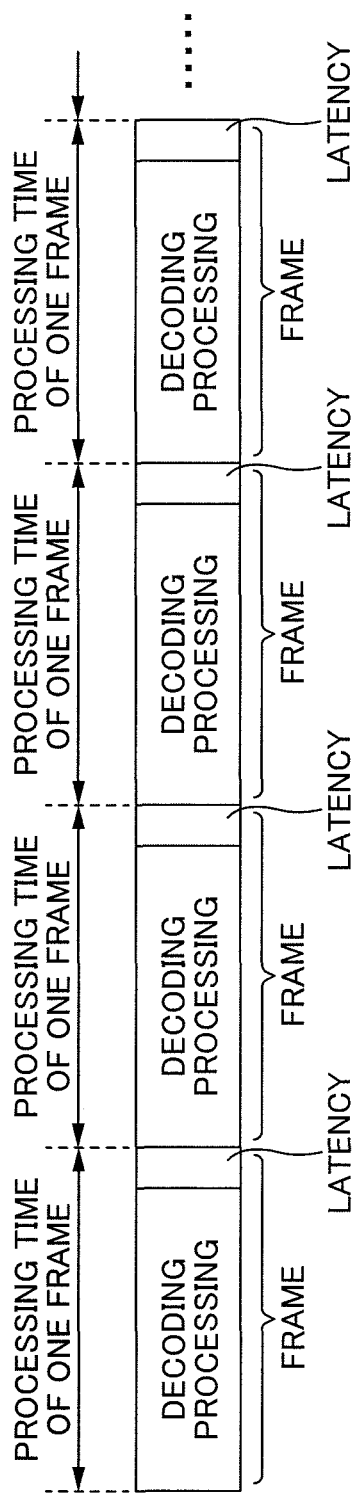
FIG. 4 is a diagram illustrating an example of decoding process.
Figure 4:
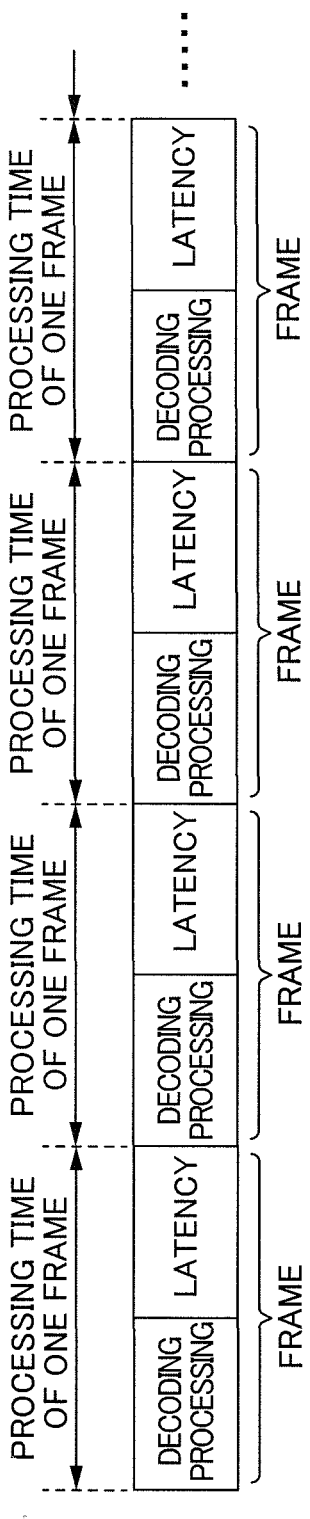
Figure 5:
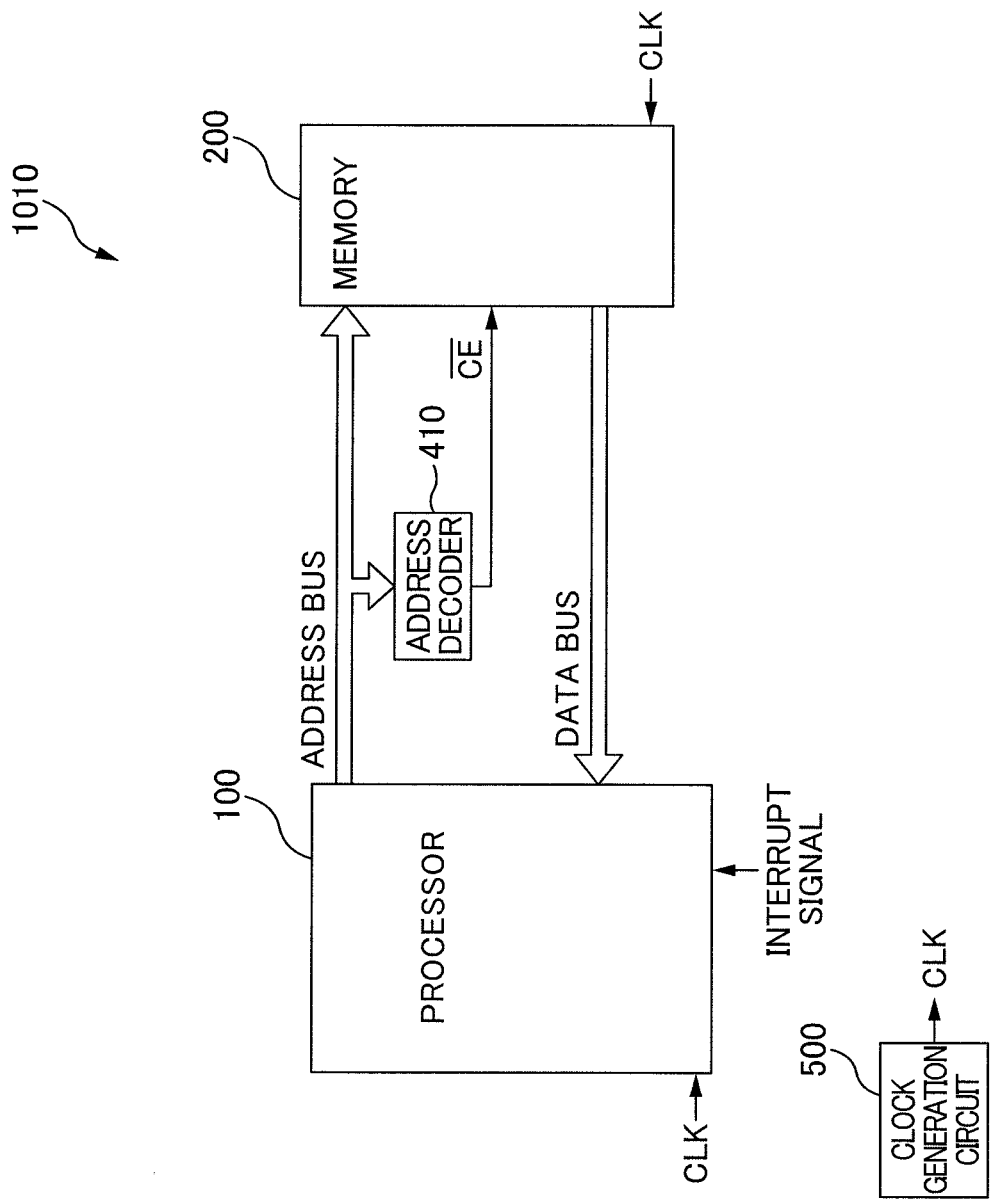
FIG. 5 is a diagram illustrating a configuration diagram of an instruction execution circuit of a comparison target.
Figure 6:
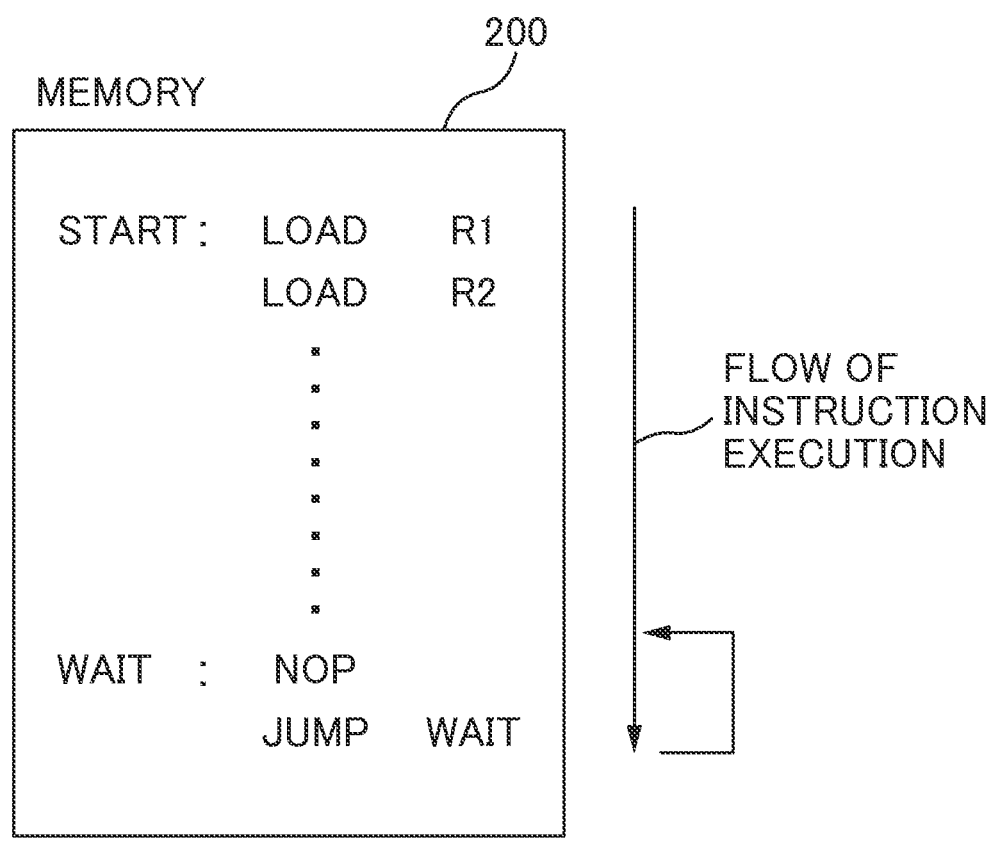
FIG. 6 is a diagram illustrating an example of a program of the comparison target.

When the case of a large data amount in one frame is compared with the case of a small data amount, as illustrated in FIG. 4, since, in the case of a large data amount in one frame (case A), decoding requires long time for that portion, the latency time becomes short, while in the case of a small data amount in one frame (case B), decoding requires only short time, and the latency time becomes long.

In the instruction execution circuit 1000 according to an embodiment of the present invention, the "NOP" instruction and the "JUMP WAIT" instruction executed by the processor 100 in a repetitive manner until the reproduction of the decoded digital data is completed are stored in the register 300.

During that period, the instruction is not read out of the memory 200 which requires large power consumption. Therefore, in the instruction execution circuit 1000 according to an embodiment of the present invention, during a period of the time adjustment until the reproduction of the decoded digital data is completed, processing can be executed only with the minimum power consumption of reading the instruction from the register 300.

A rate of the latency time to the entire processing time for one frame including the decoding processing time and the above latency time increases as the bit rate or sampling frequency is lowered and sometimes becomes approximately 50%. Most of the power consumption when the digital sound data is encoded and decoded is caused by access to an instruction or data in the memory circuit (reading and writing). Therefore, by suppressing the instruction reading from the memory 200 with large power consumption during the latency time and by reducing the power consumption of the memory 200, the power consumption of the entire instruction execution circuit 1000 can be drastically reduced.

Particularly, many of the electronic devices which can handle sound as digital data as above are operated by power from a battery such as a mobile phone, a portable music player, an IC recorder, an on-board music player and the like, the advantage of suppression of power consumption is large.

In an embodiment of the present invention, the case of decoding sound data has been described, but it can be also applied to the case of encoding. Moreover, it can be also applied to encoding and decoding not only of sound data but also of image data and video image data.

Also, an embodiment of the present invention is suitable if a microcomputer or DSP (Digital Signal Processor) is mounted on an integrated circuit of compressed sound processing, but it can also be applied to various cases other than that.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An instruction execution circuit, comprising:
   a processor for providing addresses to an address bus and transferring data over a data bus for fetching and executing instructions;
   a memory having a first plurality of memory locations allocated to a first predetermined portion of a memory map and an enable input for receiving a first enable signal, wherein the memory goes into a low power mode when the first enable signal is inactive;
   a register having a second plurality of memory locations allocated to a second predetermined portion of the memory map and an enable input for receiving a second enable signal;
   an address decoder having an input coupled to the address bus, for activating the first enable signal when an address provided by the processor is in the first predetermined portion of the memory map, and activating the second enable signal when an address provided by the processor is in the second predetermined portion of the memory map;
   wherein the memory stores a plurality of instructions including a jump instruction to one of the second plurality of memory locations; and
   wherein the register stores a loop of instructions starting from the one of the second plurality of memory locations and returning to the one of the second plurality of memory locations.

2. The instruction execution circuit according to claim 1, wherein:
   the plurality of instructions comprise audio processing instructions for decoding audio data encoded in accordance with an audio encoding and decoding standard.

3. The instruction execution circuit according to claim 2, wherein the audio encoding and decoding standard comprises one of the MP3, WMA, and AAC standards.

4. The instruction execution circuit according to claim 1, wherein:
   the processor is adapted to interrupt loop processing and start execution of an instruction stored in the memory in response to an interrupt signal.

5. The instruction execution circuit according to claim 1, wherein:
   the memory includes one of a ROM and a RAM.

6. The instruction execution circuit according to claim 1, wherein the processor, the memory, the register, and the address decoder are combined in an integrated circuit.

7. The instruction execution circuit according to claim 1, wherein the processor comprises a digital signal processor.

8. The instruction execution circuit of claim 1, wherein:
   the instruction execution circuit further includes a clock generation circuit for generating a clock signal;
   the memory further has an input for receiving the clock signal; and
   the clock generation circuit continues to generate the clock signal when the address decoder does not activate the first enable signal.

9. The instruction execution circuit of claim 8, wherein:
   the processor further includes an input for receiving the clock signal.

* * * * *